United States Patent [19]

Gakhar et al.

[11] Patent Number: 4,942,912
[45] Date of Patent: Jul. 24, 1990

[54] ROUTER ATTACHMENT

[75] Inventors: Ved P. Gakhar; Richard A. Dossett; Wilfred M. McCord, Jr., all of Louisville, Ky.

[73] Assignee: Vermont American Corporation, Louisville, Ky.

[21] Appl. No.: 362,215

[22] Filed: Jun. 6, 1989

[51] Int. Cl.$^5$ .............................................. B27C 5/10
[52] U.S. Cl. .................................... 144/136 C; 30/373; 30/374; 144/134 D; 144/136 R; 144/371
[58] Field of Search ............... 30/373, 374; 409/182; 144/134 R, 134 D, 136 R, 136 C, 371, 137, 150

[56]  References Cited

U.S. PATENT DOCUMENTS

| 2,587,994 | 3/1952 | Gregory . | |
| 2,610,658 | 9/1952 | Koeling | 144/136 C UX |
| 2,952,281 | 9/1960 | Weber | 144/136 C |
| 2,970,618 | 2/1961 | Mitchell . | |
| 3,282,308 | 11/1966 | Sprague | 144/136 C UX |
| 3,841,368 | 10/1974 | Ritter . | |
| 4,615,654 | 10/1986 | Shaw . | |
| 4,630,656 | 12/1986 | Collins . | |
| 4,718,468 | 1/1988 | Cowman . | |
| 4,763,706 | 8/1988 | Rice . | |
| 4,777,991 | 10/1988 | Adame . | |

FOREIGN PATENT DOCUMENTS 2838233  6/1979  Fed. Rep. of Germany ... 144/134 D
3644925  2/1988  Fed. Rep. of Germany .

Primary Examiner—W. Donald Bray
Attorney, Agent, or Firm—Middleton & Reutlinger

[57] ABSTRACT

A router attachment which is particularly useful for cutting the slots to receive standard biscuits used in biscuit joinery.

22 Claims, 6 Drawing Sheets

ROUTER ATTACHMENT

BACKGROUND OF THE INVENTION

The present invention pertains to router attachments. This particular router attachment is especially useful in cutting slots to receive standard biscuits used in biscuit joinery.

Biscuit joinery has been popular for several years. In general, it involves using a biscuit joiner machine with a four-inch circular blade which is plunged edgewise into the workpiece to cut a slot defining a segment of a circle. The depth of the cut is varied depending upon the size of biscuit to be used. At this time, there are three standard biscuit sizes. To make a joint using biscuit joinery, identical slots are cut in two pieces of wood; the slots in two pieces of wood are aligned; glue is put in the slots and on the faces of the wood to be joined; and the two pieces of wood are brought together with the biscuit fitting into the two adjacent slots. The biscuit swells to take up the space, making this a very strong and very easy-to-use joint.

Such a joint would be very popular with home woodworkers because of its ease of use, except that the "biscuit joiner" machine used to cut the slots is generally a dedicated machine for only that purpose, costing $250 and up. That price is prohibitive for most home woodworkers, who have already had to purchase a table saw or radial arm saw, a router, a sander, and perhaps other expensive tools.

The idea of using a router to cut such a groove would generally be dismissed, because a router operates at a much higher speed than a biscuit joiner, and therefore generally is not suited for use with a blade as large as four inches in diameter.

SUMMARY OF THE INVENTION

The present invention solves the problems of the prior art by providing an inexpensive router attachment which, when used with a router and a special router bit, will cut the slot that receives the biscuit. Thus, it permits home woodworkers to take advantage of biscuit joining techniques with a small investment in equipment.

It also overcomes the problem of rotating a large diameter blade at the high router speeds by using a smaller diameter blade and modifying the cutting technique to cut the standard-sized grooves.

It overcomes problems of other kinds of router attachments by providing a stable initial cutting position and by closely controlling the movement of the blade relative to the workpiece. This is important for biscuit joinery, because, if a slot is cut at the wrong angle to the face of the workpiece, the slots of adjacent workpieces will not be aligned, and the biscuit will not go into both slots or could be broken in the process of assembly. This attachment may also be useful for other operations, particularly those that involve plunging into a workpiece from the side.

BRIEF DESCRIPTION OF THE DRAWINGS

FIG. 8 is a side view of the router and the router attachment of FIG. 1 shown abutting a board, with a second position of the attachment shown in phantom;

FIG. 9 is a front view of the router attachment of FIG. 8;

FIG. 10 is an enlarged back perspective view of the depth limiter knob 46 shown in FIG. 8;

FIG. 11 is an enlarged front view of the depth limiter receptacle 38 of FIG. 8;

FIG. 12 is a view taken along the section 12—12 of FIG. 11;

DESCRIPTION OF THE PREFERRED EMBODIMENTS

Figures 1, 2:
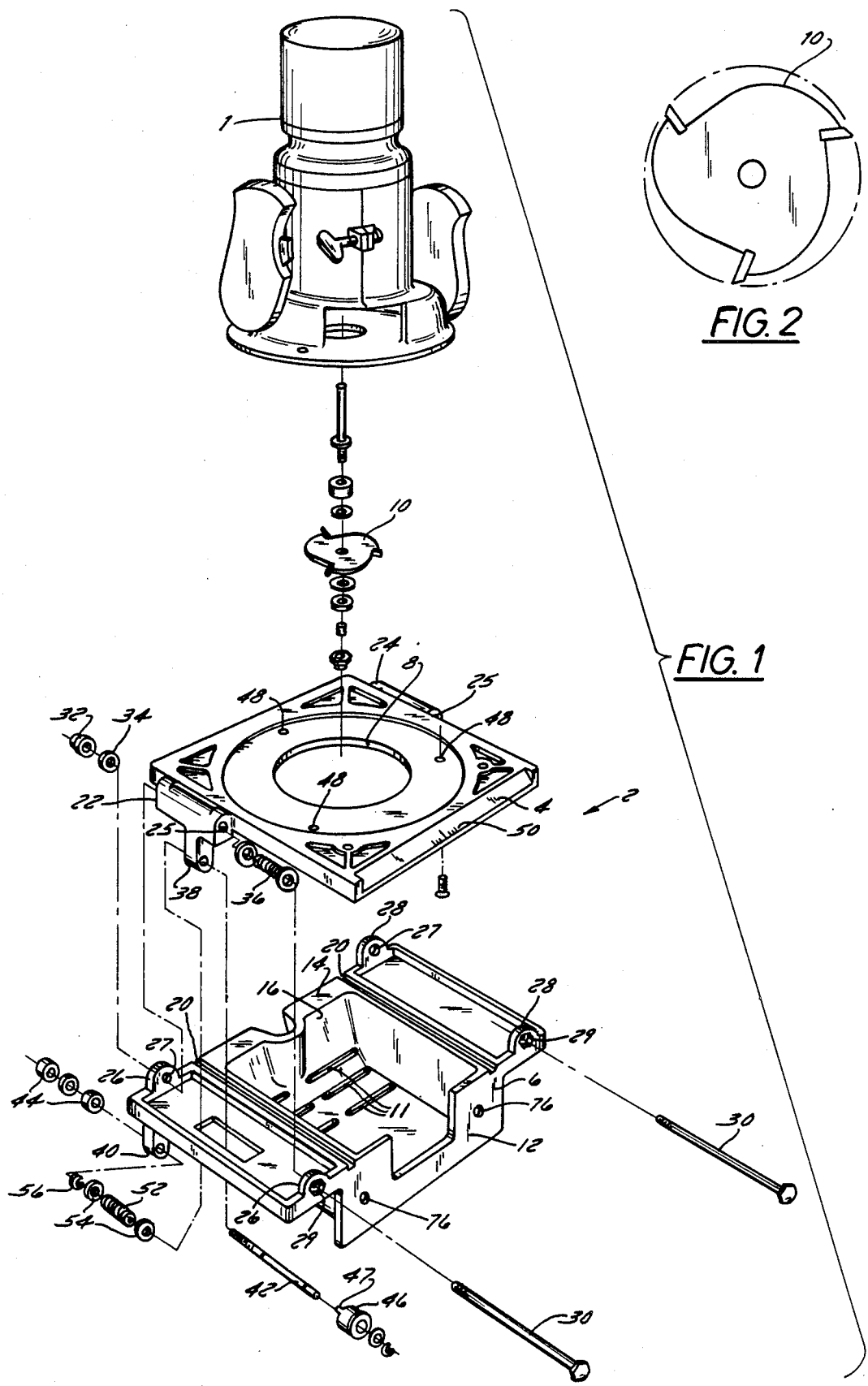
FIG. 1 is an exploded perspective view of a router, the router bit, and the router attachment of the present invention.
FIG. 2 is a top view of the router bit of FIG. 1.

The router attachment 2 is made of two main parts, a flat plate 4 and a base member 6. The flat plate 4 defines a hole 8 which permits the cutter 10 to pass through. The cutter 10 shown here is approximately two inches in diameter—substantially smaller than the standard four-inch blade used in biscuit joiners. The base member 6 has a flat front surface 12 for abutting the face of the workpiece into which the slot is to be cut. The base member 6 has a top surface 14 and defines a central opening 16 in its top surface 14 which extends through the flat front surface 12. This central opening 1 provides room for the router bit 10 to move so that it can begin in a recessed position behind the flat front surface 12 and then move forward through the flat front surface 12 to contact the workpiece. The bottom of the base member 6 defines elongated holes 11, which permit sawdust to fall through the base 6.

The flat plate 4 has a pair of elongated ridges 18 (See FIG. 9) projecting downward along the back portion of the flat plate 4, and the base member 6 defines a pair of elongated grooves 20 along the entire length of its top surface 14 which receive the respective elongated ridges 18. The elongated grooves 20 run perpendicular to the flat front surface 12 of the base member 6. This means that, when the flat plate and the base member 6 are assembled, with the elongated ridges 18 sliding in the elongated grooves 20, the flat plate 4 can only move back and forth relative to the base 6 in a line perpendicular to the flat front surface 12. The ridges 18 and grooves 20, or the entire flat plate 4 and base member 6, may be made of materials such as special polymers which reduce the amount of friction caused by the sliding of the two parts relative to each other.

The flat plate 4 includes a left ear 22 and a right ear 24, each of which has a hole for receiving a pin. The base member 6 includes left ears 26 and right ears 28, which have holes 27 for receiving a pin. The front ears 26, 28 have an enlarged front portion 29 of the hole 27 for receiving bolt heads in a recessed position. When the router attachment 2 is assembled, the left ear 22 of the flat plate lies between the left ears 26 of the base member 6 with the hole 25 of the ear 22, and the holes 27 of the ears 26 being cooperatively aligned so that the pin or bolt 30 can extend through all the holes 25, 27 in the left set of ears 22, 26 and be fastened in place by means of a nut 32 and washer 34. The bolt 30 will then lie perpendicular to the flat front surface 12. There is a fairly large space between the left ear 22 of the flat plate 4 and the left ears 26 of the base member 6 to permit the flat plate 4 to move forward and backward relative to the base member 6 in a line perpendicular to the flat front surface 12.

A spring 36 with washers at both ends is installed surrounding the pin 30 between the front left ear 26 of the base member 6 and the left ear 22 of the flat plate 4 to bias the flat plate backward, so the router bit 10 will be biased to a recessed position inside the flat front surface 12.

The same mounting arrangement is found on the right side of the attachment 2, with the right ear 24 of the flat plate 4 fitting between the right ears 28 of the base 6 with the right set of holes 25, 27 aligned and a right pin 30 extending through the holes in the right ears 24, 28 and being secured by a nut and washer 32, 34. Again, a spring 36 with washers at both ends is mounted surrounding the right pin 30 to bias the router bit 10 to a recessed position.

The flat plate 4 also has on its left side a downwardly-projecting ear 38 with a hole through it, and there is a corresponding downwardly-projecting ear 40 in the left side of the base member 6 with a hole through it, aligned with the hole through the ear 38. A depth control rod 42 extends through the holes in the downward ears 38, 40 and is used to limit the forward and backward motion of the flat plate 4 relative to the base 6. The back end of the depth control rod 42 is threaded, and a pair of enlarged diameter back stops 44 are threaded onto that back end with a washer 45 between them. This threaded arrangement permits some adjustment of the position of the back stop 44 on the depth control rod 42. The front end of the depth control rod 42 has a head 46 which can be used to adjust the depth of cut depending upon which size biscuit is to be used. The head 46, shown clearly in FIG. 10, has a tooth 47 which selectively projects into each of the three different depth control slots 49 in the ear 38 of the flat member 4.

Figures 8, 9, 10, 11, 12:
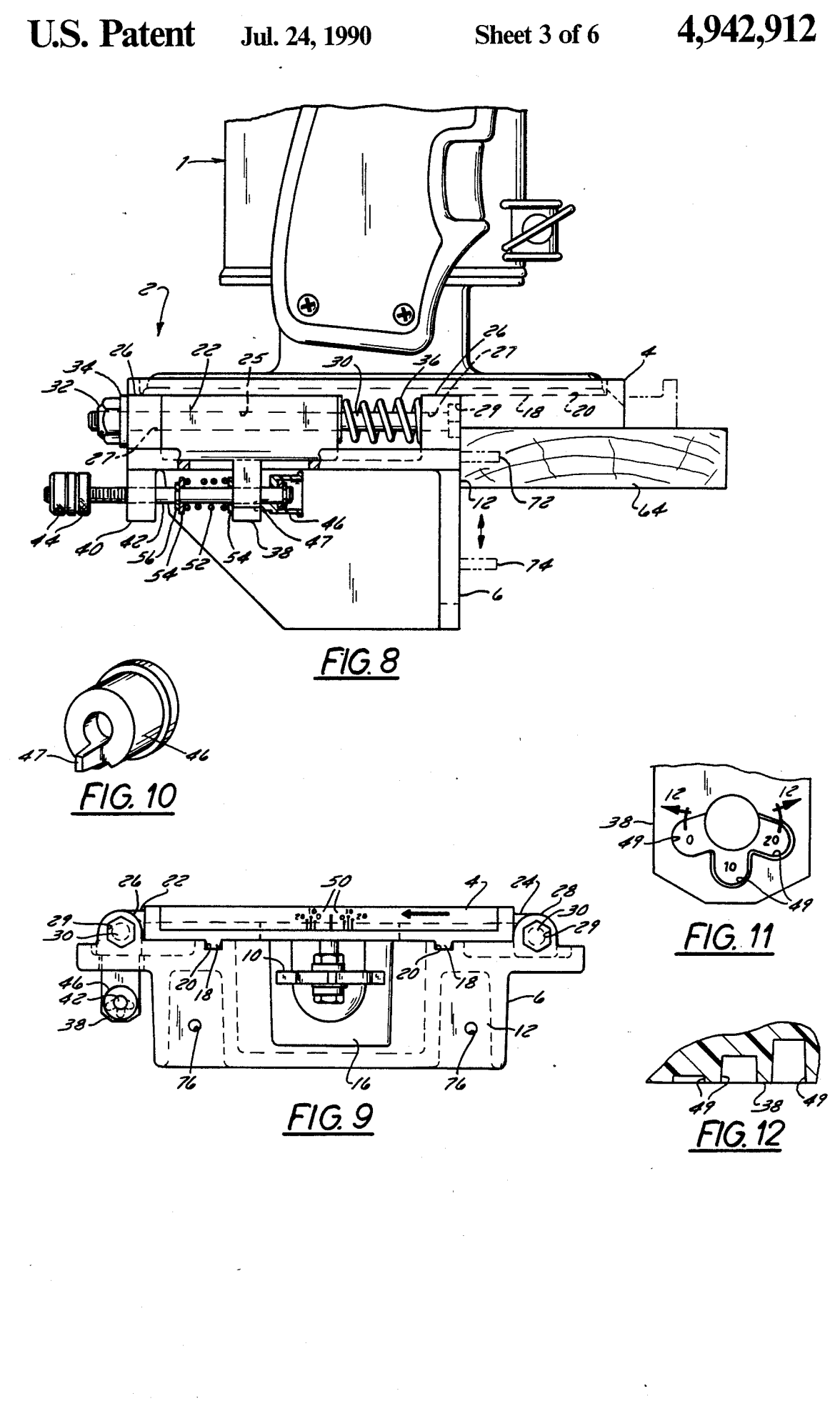

The depth control slots 49 are shown in more detail in FIGS. 11 and 12. The slots have different depths and are labelled according to the standard size of biscuit slot they will cut, with 0 being used for the shortest depth of cut and the smallest biscuit, 10 for the medium size biscuit and medium depth of cut, and 20 for the largest biscuit and largest depth of cut. A spring 52, with washers 54 at both ends, surrounds the depth control rod 42 and lies behind the ear 38 of the flat member 4. The rear washer 54 abuts a snap ring 56, which snaps into a groove in the depth control rod 42. Thus, the spring keeps the tooth 47 in its slot 49 until the operator pulls the head 46 outward against the force of the spring 52, rotates the head 46 to align the tooth 47 with a different slot 49, and then lets the spring force pull the tooth 47 into the different slot 49, thereby selecting a different depth of cut.

The flat plate 4 has three screw holes 48 through it (See FIGS. 1 and 13) for attaching the flat plate 4 to the bottom of a router. Screws are also provided to attach the plate 4 to the router. Different sets of screw holes can be provided to match the holes in different routers. The flat plate 4 also has markings 50 on its front surface which define the positions to which the flat plate must moves sideways to elongate the slot for the different sizes of biscuits.

Figure 3:
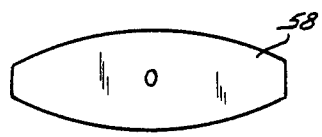
FIGS. 3 and 4 are plan views of two standard biscuit sizes.
Figure 4:
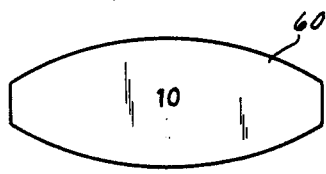
Figure 5:
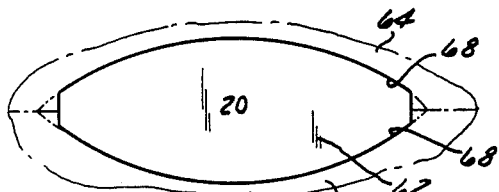
FIG. 5 is a top broken-away sectional view of two boards connected together by a third standard size of biscuit.
Figure 7:
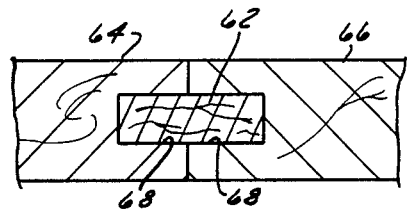
FIG. 7 is a broken-away side sectional view of the boards of FIG. 6 when joined together.
Figure 6:
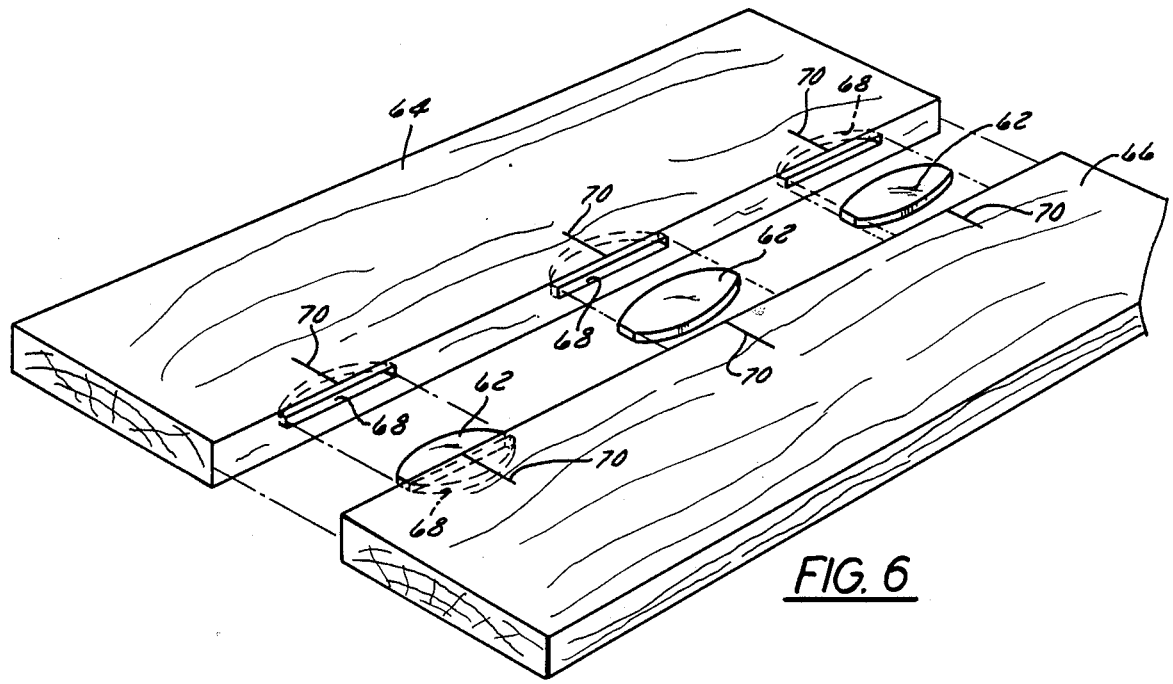
FIG. 6 is an exploded perspective view of two boards that are joined together by biscuits.

FIGS. 3–7 show how biscuits are used to joint two pieces of wood together. FIGS. 3, 4 and 5 show the three different sizes of biscuits 58, 60, and 62, respectively. These sizes are referred to in the art as #0, #10 and #20 biscuits. FIG. 6 shows two pieces of wood, 64, 66, being joined together by three large-sized biscuits 62. Slots 68 are cut in the edges of the boards 64, 66. Glue is put on the edges of the boards 64, 66 and into the slots 68 and the biscuits are put into the slots 68, bringing the two pieces of wood 64, 66 together so each biscuit 62 is located half in the slot 68 of one board 64 and half in the slot 68 of the other board 66. The assembled joint is shown in FIGS. 5 and 7. The glue causes the biscuit to swell so it fits snugly in the slots, making a strong, solid joint.

Figure 13:
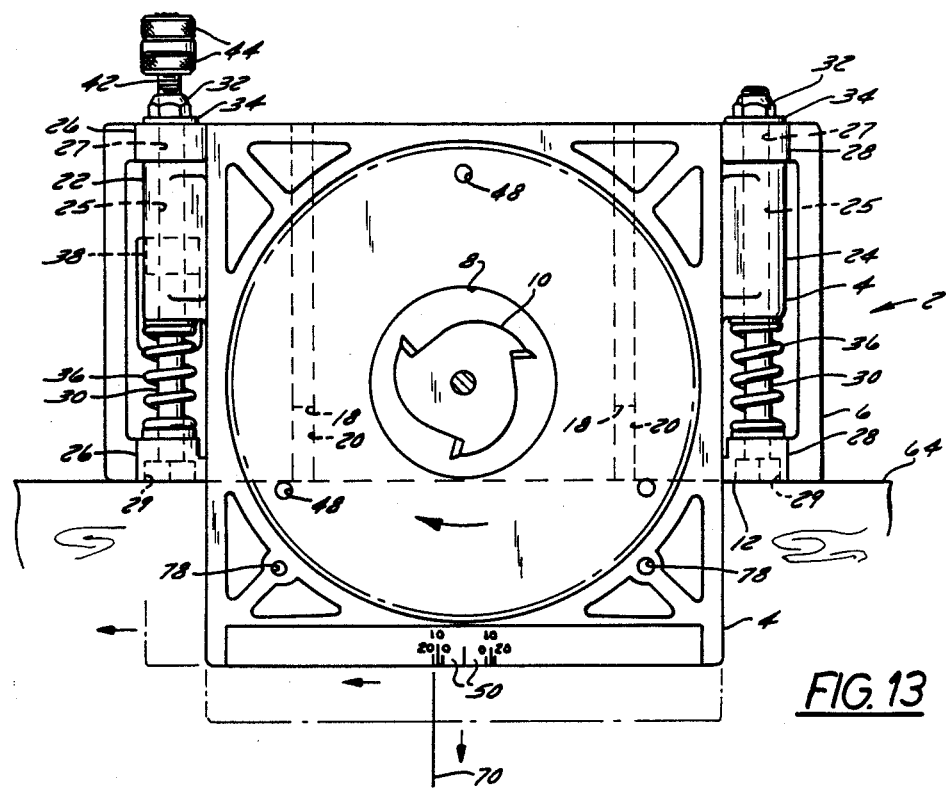
FIG. 13 is a top view of the router attachment of FIG. 1, showing a board abutting the attachment.
Figure 14:
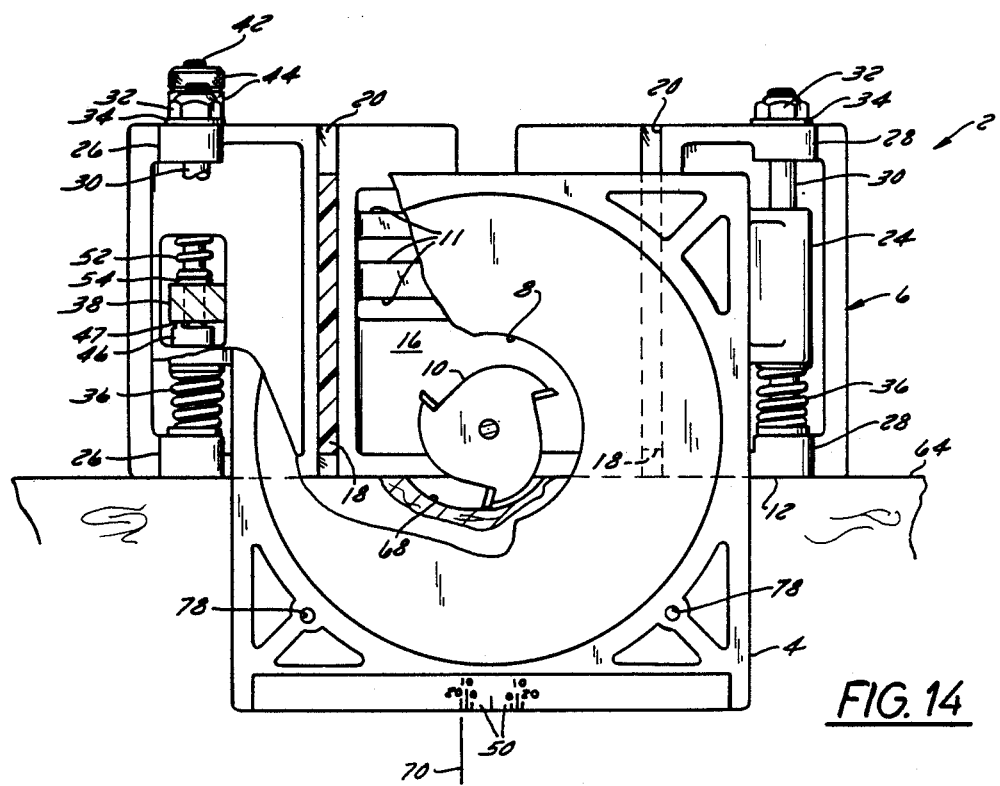
FIG. 14 is a top view of the router attachment and board of FIG. 13 partially in section and with the router bit having cut into the board as far as the depth limiter permits.

The operation of this device to cut slots for biscuits is as follows:

Centerlines 70 are marked on the top surface of the workpiece (such as the board 64) to define the locations where the slots or grooves are to be cut. The biscuit joiner attachment is brought into contact with the workpiece as shown in FIGS. 8 and 13. Even in its retracted position, the flat plate 4 projects forward a substantial distance beyond the flat front surface 12, so the bottom of the flat plate rests on the top surface of the workpiece 64, and the flat front surface 12 rests against the surface of the workpiece into which the slot is to be cut. The leftmost #20 marking on the flat plate is aligned with the centerline marking 70 on the workpiece as shown in FIG. 13. (From the point of view of the person operating the router, who is standing behind the router, this is the rightmost marking.) The height of the cutter 10 is controlled by the height adjustment of the router 1 itself. FIG. 8 shows in phantom two different height positions 72, 74 at which the cutter 10 can cut. The depth control head 46 is adjusted to provide the depth of cut needed for the specific size of biscuit to be used. In this case, the head will be rotated until the tooth 47 is aligned with the #20 slot, which is the deepest slot 49. The router 1 is turned on, and the operator grasps the router handles from behind the router 1 and pushes the router 1 forward, against the biasing force of the springs 36, until the cutter 10 contacts the workpiece 64. Then, the router 1 is pushed forward, with the cutter 10 plunging into the workpiece, as shown in phantom in FIG. 8 and as shown in FIG. 14, until the back stops 44 stop the forward motion of the flat plate 4 relative to the base 6 by contacting the eye 40 of the base 6. Then, to extend the cut laterally, while the cutter 10 is plunged inward as far as it will go, the router 1 is pushed to the left (right from the point of view of the operator), with the flat plate 4 sliding to the left on the top of the workpiece and the flat front surface 12 of the base 6 sliding left along the front face of the workpiece, and the cutter 10 elongates the slot until the rightmost #20 marking 50 on the flat plate 4 (leftmost from the operator's point of view) is aligned with the centerline 70 on the workpiece. (This position is not shown in the drawings.) This arrangement for elongating the slots is what permits a relatively small, approximately two-inch diameter bit used on a router to be able to cut approximately the same shape of slot normally cut by a four-inch diameter cutter on a standard biscuit joiner machine. The slots can be cut properly for the other sizes of biscuits by similarly aligning the appropriate markings 50 with the centerline 70 of the workpiece and by using the head 46 to choose the correct depth of cut.

Figure 15:
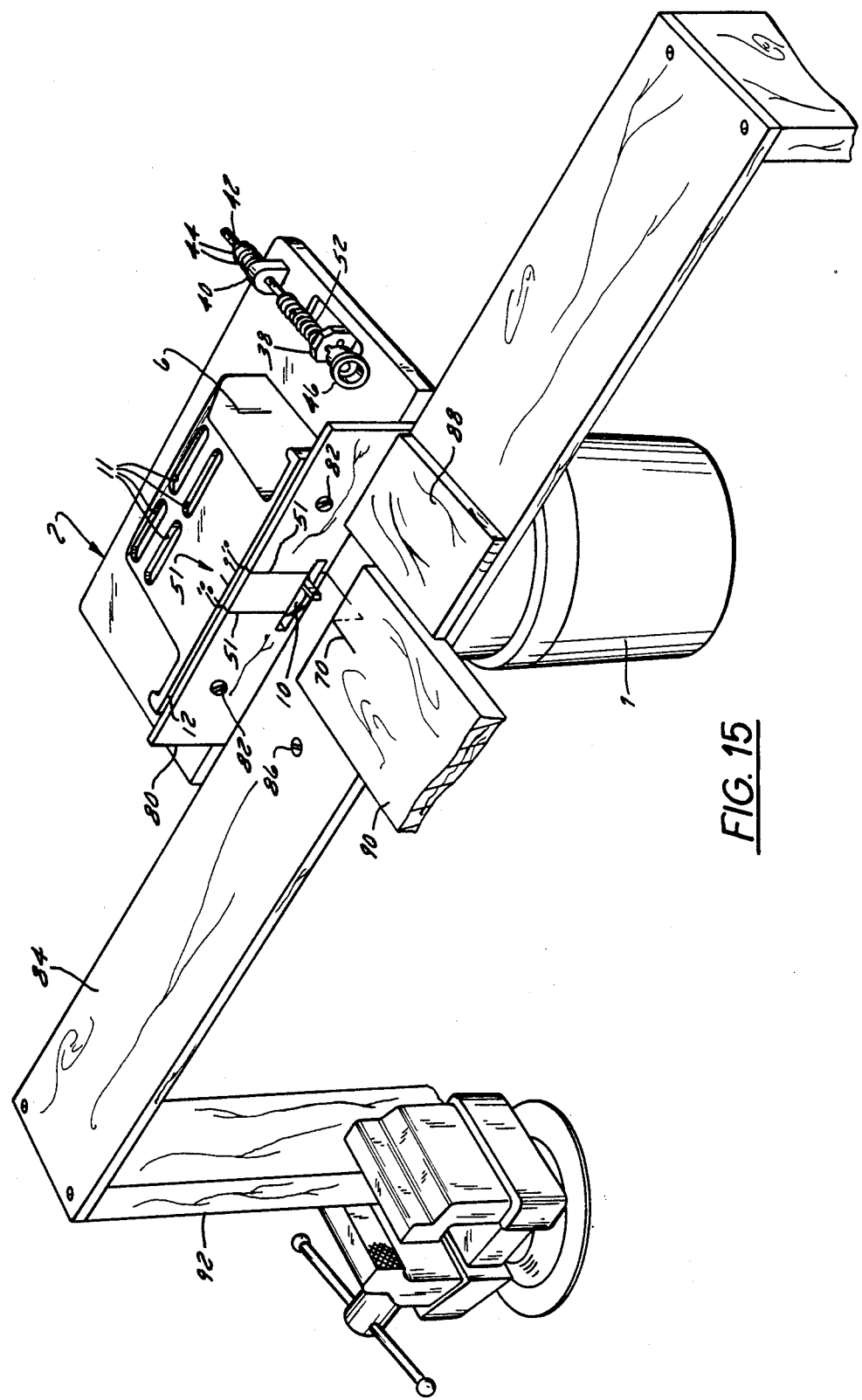
FIG. 15 is a perspective view of the router attachment and router of FIG. 1 turned upside-down and the set-up being modified for use in joining small workpieces.
Figure 17:
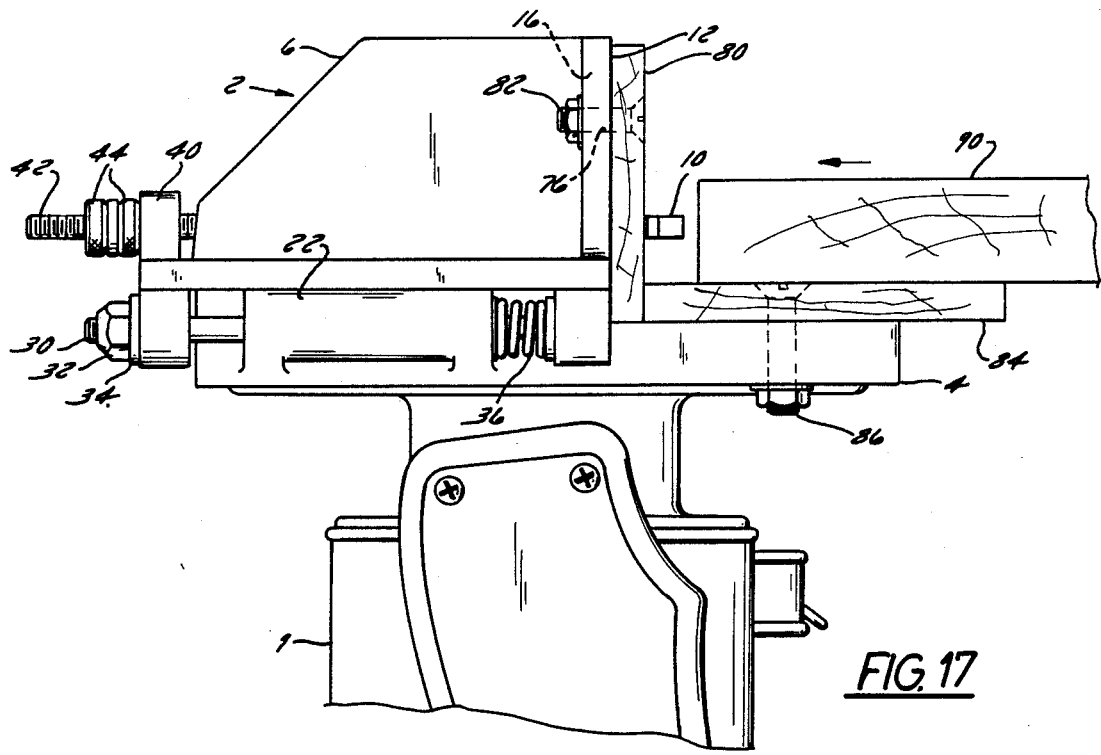
FIG. 17 is a broken-away side view of the arrangement shown in FIG. 15.
Figure 16:
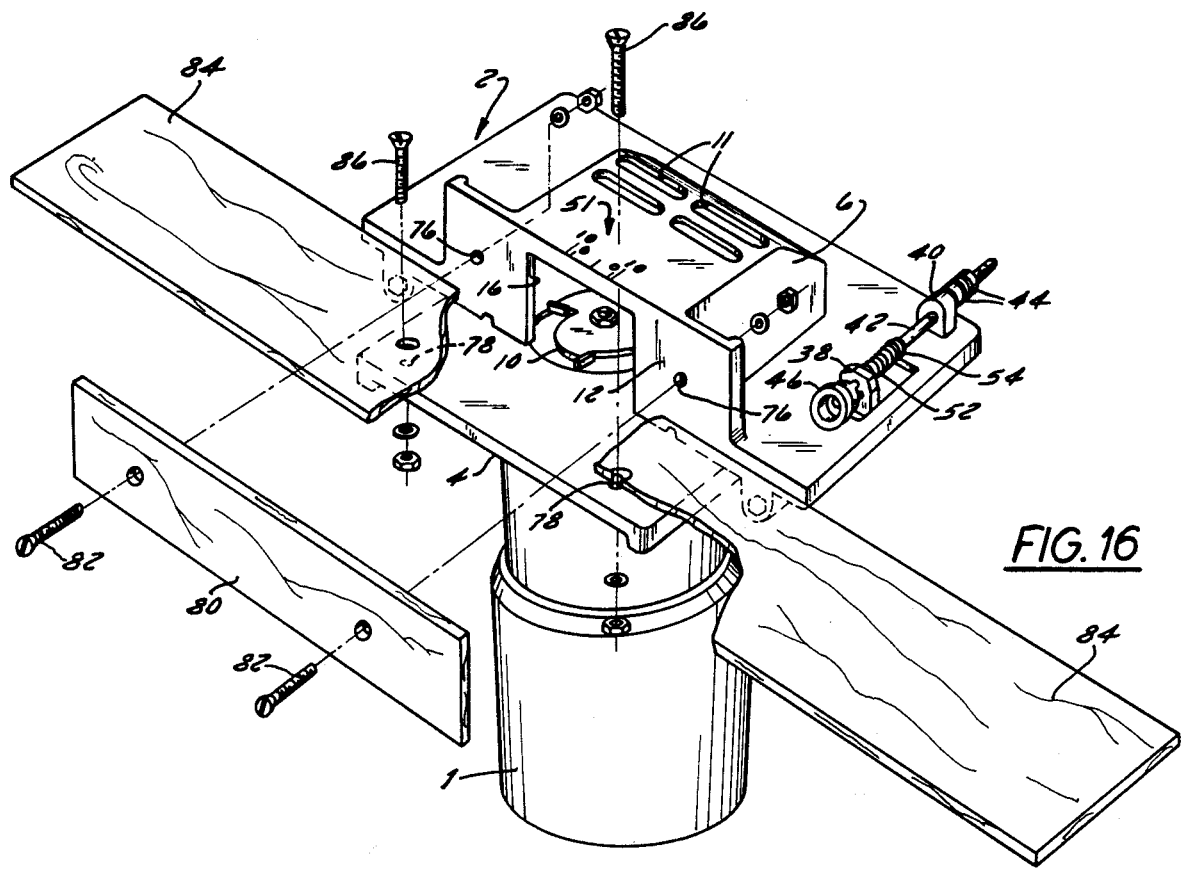
FIG. 16 is an exploded perspective view of the router attachment, router, and boards added for the arrangement shown in FIG. 15.

In some cases, the workpiece is so small that it will fit through the opening 16 in the front surface 12 of the base member 6, or it is too small to be adequately supported by the front surface 12. In these cases, an alternate set-up, including adapter pieces shown in FIGS. 15–17, is used.

The router 1 and attachment 2 are turned upside-down, with the top of the router 1 resting on a table or other firm base (not shown). It is important to be sure that there is clearance for air circulation between the table and the top of the router in order to avoid overheating the router motor. Many routers already have projections from their top surface which provide air circulation in this situation.

The operator sets the depth of cut for the appropriate size of biscuit by moving the head 46 of the depth control rod 42 into the appropriate slot 49 for the size of biscuit to be used and then adds ¼-inch (the thickness of the facing board 80) to the depth of cut by adjusting the stops 44 outward that distance. This additional adjustment is used to account for the additional distance the cutter 10 must move to go through the facing 80 before reaching the workpiece. The operator then adjusts the height of the cutter 10 using the adjustment in the router 1 to the correct height for the workpiece to be cut, taking into account that another piece of ¼-inch plywood 84 will be added to the underside of the flat plate 4.

There are two holes 76 through the flat front surface 12 of the base 6 and two holes 78 through the front portion of the flat plate 4 which are used to add parts to the attachment 2 for use with small workpieces. A facing board 80, which is preferably a piece of ¼-inch plywood, is fastened to the flat front surface 12 by means of bolts or screws 82 which pass through the facing board 80, through the respective hole 76 in the base member 6, and are fastened in back by a washer and nut. The facing board 80 rests on the flat plate 4 and lies flat against the front surface 12 of the base 6. The appropriate markings 51 for the size of biscuit to be used are drawn onto the facing 80. At this point, the opening 16 in the flat front surface 12 is completely blocked. With the router 1 in the upright position, the operator cuts through the facing 80, pushing against a scrap piece of material to make that cut.

Now, the base member 6 is pushed against the springs 36 until the cutter 10 projects outward the full extent of the depth of cut, and then the ¼-inch plywood support 84 is fastened onto the flat plate 4, abutting the facing 80, by means of bolts or screws 86 passing through the support 84, through the respective hole 78 in the flat plate 4, and fastened on the other side by washers and nuts. At this point, the cutter 10 is fixed in its extended position to provide 4 the full depth of cut, as shown in FIG. 15.

Next, the workpiece 90 is brought into alignment with the biscuit joiner. In FIG. 15, it can be seen that the center line 70 of the workpiece 90 is aligned with the rightmost marking 51 on the facing 80. An additional piece of wood 88 is mounted onto the support 84 to serve as a guide or fence for the workpiece 90 so the workpiece 90 will be in proper alignment with the cutter 10 as it is moved toward the cutter 10. The guide 88 may be clamped, nailed, or attached by other suitable means. FIG. 15 shows an additional board 92 nailed onto the end of the support 84 and held in a vise to hold the router in a fixed position during the cutting operation.

To cut a slot in the workpiece 90, the workpiece rests on the support 84 and lies against the guide 88 and is pushed toward the rotating cutter 10. When the workpiece 90 abuts the facing 80, the full depth of cut has been reached, and the workpiece is then pushed to the left while abutting the facing 80 until the centerline 70 of the workpiece is aligned with the leftmost marking 51 on the facing 80. At that point, the complete slot has been cut.

It will be obvious to those of ordinary skill in the art that modifications may be made to the device described herein without departing from the scope of the present invention.

What is claimed is:

1. A router attachment for cutting into a surface of a workpiece, comprising:
   a substantially flat plate adapted to be fixed to the bottom of a router and to rest on the top surface of the workpiece for aligning the router with the workpiece both before and during cutting;
   a base member defining a substantially flat front surface for abutting the face of the workpiece into which the cut is to be made both before and during cutting and having a top surface and defining a central opening in its top surface extending through the flat front surface, said central opening being large enough to receive a router bit; and
   cooperating means on said substantially flat plate and said base member for mounting the flat plate on the base member to limit motion of the flat plate relative to said base member to a line perpendicular to said flat front surface so that said flat plate can start at a beginning position in contact with the top surface of the workpiece and then move along the top surface of the workpiece to control the height of the cut while permitting the router bit to plunge into the face of the workpiece, while the base member remains in fixed contact with the face of the workpiece.

2. A router attachment as recited in claim 1 and further defining markings on said router attachment to indicate lateral distances which said attachment is to be moved relative to the workpiece to cut an elongated slot which will accommodate a standard size of biscuit.

3. A router attachment as recited in claim 1 or 2, and further comprising spring means cooperating with the flat plate and the base member for returning the flat plate to its beginning position after the cut is made.

4. A router attachment as recited in claim 3, wherein the substantially flat plate defines a central opening through which the router bit can pass.

5. A router attachment as recited in claim 3, in combination with a router bit having a diameter of less than four inches and adapted to cut a slot for receiving a standard biscuit.

6. A biscuit joiner, comprising:
a router;
a flat plate member attached to the bottom of the router;
a base member defining a substantially flat front surface for abutting the face of a workpiece into which a slot is to be cut and having a top surface and defining a central opening in its top surface extending through the flat front surface;
cooperating means on said flat plate and said base member for mounting the flat plate on the base member to limit motion of the flat plate relative to the base member to a line perpendicular to the flat front surface; and
a bit rotatably mounted on said router, said bit having substantially the same thickness as a standard biscuit so that, when plunged into a workpiece, said bit cuts a slot which will receive approximately one-half of a standard biscuit.

7. A router attachment for cutting into a surface of a workpiece, comprising:
a substantially flat plate adapted to be fixed to the bottom of a router and to rest on the top surface of the workpiece for aligning the router with the workpiece both before and during cutting;
a base member defining a substantially flat front surface for abutting the face of the workpiece into which the cut is to be made both before and during cutting and having a top surface and defining a central opening in its top surface extending through the flat front surface, said central opening being large enough to receive a router bit; and
cooperating means on said substantially flat plate and said base member for mounting the flat plate on the base member to limit motion of the flat plate relative to said base member to a line perpendicular to said flat front surface so that said flat plate can start at a beginning position in contact with the top surface of the workpiece and then move along the top surface of the workpiece to control the height of the cut while permitting the router bit to plunge into the face of the workpiece, while the base member remains in fixed contact with the face of the workpiece,
wherein said cooperating means on said flat plate member and said base member for slidably mounting the flat plate on the base member comprises a pair of elongated ridges on one of said members and a cooperating pair of elongated grooves defined in the other of said members adapted to receive said elongated ridges, wherein said elongated grooves and ridges lie perpendicular to said flat front surface.

8. A router attachment as recited in claim 7, and further comprising:
spring means cooperating with the flat plate and the base member for returning the flat plate to its beginning position after the cut is made; and
markings on said router attachment to indicate lateral distances which said attachment is to be moved relative to the workpiece to cut an elongated slot which will accommodate a standard size of biscuit.

9. A router attachment as recited in claim 7, and further comprising:
a first set of aligned, cooperating holes defined in the left side of said flat plate and the left side of said base member and a first pin received by said first set of aligned holes;
a second set of aligned, cooperating holes defined in the right side of said flat plate and the right side of said base member and a second pin received by said second set of aligned holes;
wherein said first and second pins are secured so they will not fall out of the holes, and wherein said pins lie perpendicular to said flat front surface.

10. A router attachment for cutting into a surface of a workpiece, comprising:
a substantially flat plate adapted to be fixed to the bottom of a router and to rest on the to surface of the workpiece for aligning the router with the workpiece both before and during cutting;
a base ember defining a substantially flat front surface for abutting the face of the workpiece into which the cut is to be made both before and during cutting and having a top surface and defining a central opening in its top surface extending through the flat front surface, said central opening being large enough to receive a router bit;
cooperating means on said substantially flat plate and said base member for mounting the flat plate on the base member to limit motion of the flat plate relative to said base member to a line perpendicular to said flat front surface so that said flat plate can start at a beginning position in contact with the top surface of the workpiece and then move along the top surface of the workpiece to control the height of the cut while permitting the router bit to plunge into the face of the workpiece, while the base member remains in fixed contact with the face of the workpiece; and
wherein said base member and said flat plate define adapter holes for mounting adapters to be used for supporting small workpieces.

11. A router attachment as recited in claim 10, and further comprising a facing member defining holes aligned with the adapter holes in the base member and adapted to lie on the flat front surface of the base member.

12. A router attachment as recited in claim 11, and further comprising a support member defining holes aligned with the adapter holes in the flat plate and adapted to lie on the underside of the flat plate.

13. A router attachment for cutting into a surface of a workpiece for cutting a slot to receive a biscuit for biscuit joinery, comprising:
a substantially flat plate defining a plurality of holes therethrough which can be aligned with holes in the bottom of a router for receiving fasteners for attaching the flat plate to the router, said flat plate being adapted to rest on the top surface of the workpiece for aligning the router with the workpiece both before and during cutting;
a base member defining a substantially flat front surface for abutting the face of the workpiece into which the cut is to be made both before and during cutting and having a top surface and defining a central opening in its top surface extending through the flat front surface, said central opening being large enough to receive a router bit; and
cooperating means on said substantially flat plate and said base member for mounting the flat plate on the base member to limit motion of the flat plate relative to said base member to a line perpendicular to said flat front surface so that said flat plate can start at a beginning position in contact with the top surface of the workpiece and then move along the top surface of the workpiece to control the height of the cut while permitting the router bit to plunge into the face of the workpiece, while the base member remains in fixed contact with the face of the workpiece.

14. A router attachment as recited in claim 13 and further defining markings on said router attachment to indicate lateral distances which said attachment is to be moved relative to the workpiece to cut an elongated slot which will accommodate a standard size of biscuit.

15. A router attachment as recited in claim 13 or 14, and further comprising spring means cooperating with the flat plate and the base member for returning the flat plate to its beginning position after the cut is made.

16. A router attachment as recited in claim 15, wherein the substantially flat plate defines a central opening through which the router bit can pass.

17. A router attachment as recited in claim 15, in combination with a router bit having a diameter of less than four inches and adapted to cut a slot for receiving a standard biscuit.

18. A router attachment as recited in claim 15, wherein said cooperating means on said flat plate member and said base member for slidably mounting the flat plate on the base member comprises a pair of elongated ridges on one of said members and a cooperating pair of elongated grooves defined in the other of said members adapted to receive said elongated ridges, wherein said elongated grooves and ridges lie perpendicular to said flat front surface.

19. A router attachment as recited in claim 18, and further comprising:
- a first set of aligned, cooperating holes defined in the left side of said flat plate and the left side of said base member and a first pin received by said first set of aligned holes;
- a second set of aligned, cooperating holes defined in the right side of said flat plate and the right side of said base member and a second pin received by said second set of aligned holes;
- wherein said first and second pins are secured so they will not fall out of the holes, and wherein said pins lie perpendicular to said flat front surface.

20. A router attachment as recited in claim 15, wherein said base member and said flat plate define adapter holes for mounting adapters to be used for supporting small workpieces.

21. A router attachment as recited in claim 20, and further comprising a facing member defining holes aligned with the adapter holes in the base member and adapted to lie on the flat front surface of the base member.

22. A router attachment as recited in claim 21, and further comprising a support member defining holes aligned with the adapter holes in the flat plate and adapted to lie on the underside of the flat plate.

* * * * *